US009363985B1

(12) United States Patent
Ford

(10) Patent No.: US 9,363,985 B1
(45) Date of Patent: Jun. 14, 2016

(54) AQUARIUM CLEANING SYSTEM

(71) Applicant: Byron K Ford, Panama City, FL (US)

(72) Inventor: Byron K Ford, Panama City, FL (US)

( * ) Notice: Subject to any disclaimer, the term of this patent is extended or adjusted under 35 U.S.C. 154(b) by 143 days.

(21) Appl. No.: 14/450,246

(22) Filed: Aug. 3, 2014

(51) Int. Cl.
*A01K 63/04* (2006.01)

(52) U.S. Cl.
CPC .................................... *A01K 63/04* (2013.01)

(58) Field of Classification Search
CPC ...................................................... A01K 63/04
USPC ........ 210/167.23, 416.1, 416.2; 137/140, 809
See application file for complete search history.

(56) References Cited

U.S. PATENT DOCUMENTS

| | | | |
|---|---|---|---|
| 2,828,019 A | 3/1958 | Lambertson | |
| 2,956,507 A | 10/1960 | Hutchinson | |
| 3,225,930 A | 12/1965 | Willinger | |
| 3,360,129 A | 12/1967 | Powers | |
| 3,734,853 A | 5/1973 | Horvath | |
| 4,094,788 A | 6/1978 | Dockery | |
| 4,233,702 A | 11/1980 | Zweifel | |
| 4,610,784 A | 9/1986 | Reyniers | |
| 4,722,670 A | 2/1988 | Zweifel | |
| 4,725,353 A * | 2/1988 | Whitman | A01K 63/045 119/226 |
| 5,048,140 A | 9/1991 | Wu | |
| 5,279,730 A | 1/1994 | Chen | |
| 5,655,245 A | 8/1997 | Bunch | |
| 5,695,654 A | 12/1997 | Schultz | |
| 5,975,022 A * | 11/1999 | Miller | A01K 61/003 119/264 |
| 6,058,884 A | 5/2000 | Rawls | |
| 6,269,773 B1 | 8/2001 | Rawls | |
| 6,878,267 B1 | 4/2005 | Mandia | |
| 7,785,476 B2 * | 8/2010 | Newman | A01K 63/045 119/263 |
| 8,534,229 B2 | 9/2013 | Hudson | |
| 8,632,677 B2 | 1/2014 | Sherman et al. | |
| 2007/0079764 A1 | 4/2007 | Flasch | |

* cited by examiner

Primary Examiner — Fred Prince
(74) Attorney, Agent, or Firm — Peter Loffler

(57) ABSTRACT

An aquarium cleaning system uses a housing that seals to the bottom of the aquarium. Water is siphoned out of the top of the housing into a vessel. As a result of the siphoned off water, additional water enters the housing via a tube assembly wherein a spray bar assembly rotates and discharges water out of a pair of opposing openings, such discharge causing a vortex. A counterflow vortex is created either by a second counterrotating spray bar assembly or via angled inlet jets on the base proximate the rotating spray bar assembly. The colliding vortexes cause substrate within the aquarium to collide and thereby clean itself. Lighter waste material is carried out of the housing by the laminar water flow of the siphon with the substrate loosing sufficient kinetic energy from the laminar flow so as to gravitationally settle back toward the base of the housing.

12 Claims, 6 Drawing Sheets

AQUARIUM CLEANING SYSTEM

BACKGROUND OF THE INVENTION

1. Field of the Invention

The present invention relates to a system that uses countercurrents to clean small granule sized substrate, such as Aragonite sand, found within a typical aquarium, as well as to remove dissolved nitrogenous waste material that has accumulated within the aquarium.

2. Background of the Prior Art

Most aquaria include, among other features, a layer of substrate or granular material which covers the bottom of the display tank. It has been observed that besides its aesthetic function, this substrate layer serves as a trap for the purpose of accumulating waste materials produced, either directly or indirectly, by the aquarium inhabitants. At the same time, dissolved nitrogenous waste materials accumulate in the aquarium water, necessitating removal of these materials by periodic water changes. The most efficient means of addressing both of these problems is to remove water from the system for the purpose of changing the water while simultaneously cleaning the substrate with a substrate-cleaning device.

Since the 1950s, several devices have been proposed for the removal of waste material embedded in and adhered to aquarium substrates. By far the most commonly used device in use today is the standard gravel cleaner (used in one form or another for at least the last several decades). The typical gravel cleaner comprises a larger diameter tube or housing attached, in series by means of a reducing coupling, to a smaller diameter siphon hose. In operation, water and gravel are ingested into the bottom of this hand-manipulated device through a large diameter aperture at the base of the housing (large diameter) tube. The gentler flow within the housing allows constant mixing of aquarium water and gravel that has been ingested through this aperture. Loose deposited debris rises immediately through the column of the housing tube and out of the top of the housing via the siphon tube by virtue of its lesser specific gravity. Collisions between gravel particles in the gravel-water slurry within the housing tube result in removal of some of the organic film that covers each gravel particle. The substrate material is too heavy to exit the top of the device housing with the waste (except during transfer of the device from one location to another if the tube has been allowed to fill with too much substrate). Accumulated substrate suspended within the device housing is then returned to the aquarium by tilting the device or by occluding the siphon hose. The device is simple to set up and loss of substrate is soon minimized as the aquarist gains expertise in the use of the equipment.

A far less commonly used device to clean the substrate and to remove dissolved nitrogenous waste material within an aquarium leaves apertures in the housing tube through which water enters forcefully when the relatively large bottom aperture of the housing is blocked by contact with the bottom surface of the aquarium. These apertures, which act as jets, can be directed in such a way as to cause the water-gravel slurry to rotate in vortex fashion within the housing tube to increase the number of substrate particle collisions as well as the force of such collisions. However, these prior art devices suffered from their inability to completely seal the device against the bottom of the housing tube resulting in decreased force of flow through the apertures. Additionally, such prior art devices use an in-line pump/filter arrangement to force water through the device. While having the advantage of reducing the operation to a single step, this approach results in one of two potential disadvantages. The use of finer filter media traps the smaller particles of sediment removed by the device but results in diminished flow through the device because the pump must force water through a filter which quickly plugs up with sedimentary material. The use of coarser filter media results in decreased resistance to flow and thus better removal of adhered organic material by the device, but allows the smaller particles of sediment past the filter and back into the aquarium, hence the loss of efficiency in the form of retained particulate organic carbon (POC) within the aquarium system. This conundrum (loss of efficiency on either side of the filter-medium fineness curve) is an inherent property of in-line pump/filter use.

Nevertheless, the typical gravel cleaner has functioned reasonably well in salt-water systems using crushed coral aggregate as substrate for many years. The comparatively gentle mixing of water and gravel at the base of the device, while enough to remove non-adhered sediment, tended to leave most of the thin film of adhered organic material coating the individual gravel particle which was left within the aquarium system. This material, when further degraded by bacterial action, contributed to the total dissolved organic carbon (DOC) load of the system, thereby increasing nutrient levels in the water. Increased nutrient load is particularly undesirable for aquarists attempting to maintain delicate invertebrates like corals because the nutrients function as fertilizer for the algae which then compete successfully with the corals for space on the rock-pile. Aquarists attempt to balance nutrient import (feeding the system) with nutrient export (waste material successfully removed from the system) in order to maintain the low nutrient level conditions which favor the growth of marine invertebrates and which most closely replicate conditions on the natural coral reef. The functions performed by substrate cleaning are performed by tide and wave action on the coral reef, thus maintaining the low-nutrient conditions in which the organisms inhabiting this delicate ecosystem evolved.

In addition to the above-mentioned limitation of the typical gravel cleaner, the introduction of aragonite sand onto the aquarium industry introduced a new complication. While the sand was aesthetically superior, cleaning this substrate was complicated by the fact that the lighter sand particles would be vacuumed out of the system along with the particulate organic waste if a typical gravel cleaner was used. This problem could be addressed by using a smaller diameter siphon tube with the typical gravel cleaner, slowing the rate at which water rises inside the device and preventing substrate loss. However, this limitation slows even further the turbulence at the base of the device, allowing even more adhered waste to remain behind after the cleaning, resulting in diminished nutrient export. This difficulty has, in part, resulted in the development of a school of thought advocating no substrate cleaning at all. Failure to clean the substrate has proven to be even more deleterious to the aquarium inhabitants because the finer substrate impedes the flow of water below its surface and allows the establishment of zones of anaerobic bacterial degradation. These zones, in turn, allow the buildup of highly toxic sulfur-bearing compounds which may be liberated into the aquarium water whenever the substrate is disturbed by action of fish or by rearrangement of decorative rocks.

Yet another school of thought (called the Berlin method) eliminates the substrate altogether, allowing the aquarist to suction the waste material directly off the bare base of the aquarium. This, to most, is aesthetically unappealing & allows algae to directly colonize the aquarium bottom. In addition, the lack of substrate results in less sediment trapping & increased accumulation of sediment directly on corals & inaccessible areas of the rock pile.

What is needed is a device that addresses the above stated shortcomings in the art by providing a system that greatly improved separation of substrate and waste material in comparison to the prior art gravel cleaners.

SUMMARY OF THE INVENTION

The aquarium cleaning system of the present invention addresses the aforementioned needs in the art by providing a modified "gravel cleaner" with the actual purpose of separating aragonite sand (an increasingly popular aquarium substrate, or bottom material) from particulate organic carbonaceous material (animal waste, algae, products of decomposition) which has precipitated out of the water-column and become integrated into the bottom material or adhered to the surface of individual particles of substrate material forming an organic film which is more difficult to dislodge than the settled particulate material. Successful removal of this material is critical for good husbandry of delicate freshwater and marine organisms as failure to perform this maintenance function is the chief reason for failure of hobbyists to replicate natural habitat and experience success in this otherwise rewarding field of endeavor.

This improved action is achieved when sand particles have kinetic energy imparted to them in opposing directions by a combination of dynamic and static jets or dual dynamic jets within the device, so that the particles then collide with other particles, effectively rubbing off the film of organic material. Although the non-adhered particulate matter is quickly removed, the longer the device is allowed to process an aliquot of substrate, the more of this adhered POC is removed. The cost of this operation is the loss of more aquarium water into the wastewater receptacle. If the water thus spent exceeds the amount that the aquarist desires to remove from the system during the current water-change cycle, the user may return as much of the effluent-water to the system (after particulates removed by settling or filtration or both) as is necessary.

The aquarium cleaning system is comprised of a tubular housing member that has an open top and an open bottom. A rubber bottom encompasses the bottom of the housing. A reducing cap is attached to the top of the housing. A siphon hose extends from the reducing cap. A pair of first openings is located on opposing sides of the housing medially between the top and the bottom, each of the openings fluid flow connected to a fitting. A first spray bar assembly is downwardly and rotatably connected to the fitting. The first spray bar assembly has a pair of outwardly extending first arms. Each first arm has a second opening thereon such that each second opening faces in opposing direction relative to the other second opening. When the housing is placed into the body of water so that the first openings are within the body of water (below the water line), a water stream enters into the first openings due to the pressure differential across the housing wall of the device created by removal of water from the interior of the device by the siphon. The water stream flows into the first spray arm assembly and out of each second opening causing the first arms to rotate such that the water stream causes a first vortex to rotate within the housing as a result of the rotational discharge from the second opening of each first arm of the first spray bar assembly. Means are provided for allowing water to enter the housing and to create a second vortex within the housing, which second vortex counter-rotates within the housing. A pair of screens is provided and each covers a respective one of the first openings. A valve is located on the siphon hose. At least one riser arm is attached to the housing. The riser arm retractably extends below the rubber boot. The means for allowing water to enter the housing comprises either at least one angled opening located in the housing proximate the bottom or a second spray bar assembly that is upwardly and rotatably connected to the fitting. The second spray bar assembly has a pair of outwardly extending second arms. Each second arm has a third opening thereon such that each third opening faces in opposing direction relative to the other third opening. When the housing is placed into the body of water so that the first openings are within the body of water, a water stream enters into the first openings. The water stream flows into the second spray arm assembly (as well as the first spray arm assembly) and out of each third opening causing the second arms to rotate in a direction opposite to the direction of rotation of the first spray arm assembly.

DESCRIPTION OF THE PREFERRED EMBODIMENT

Figure 1:
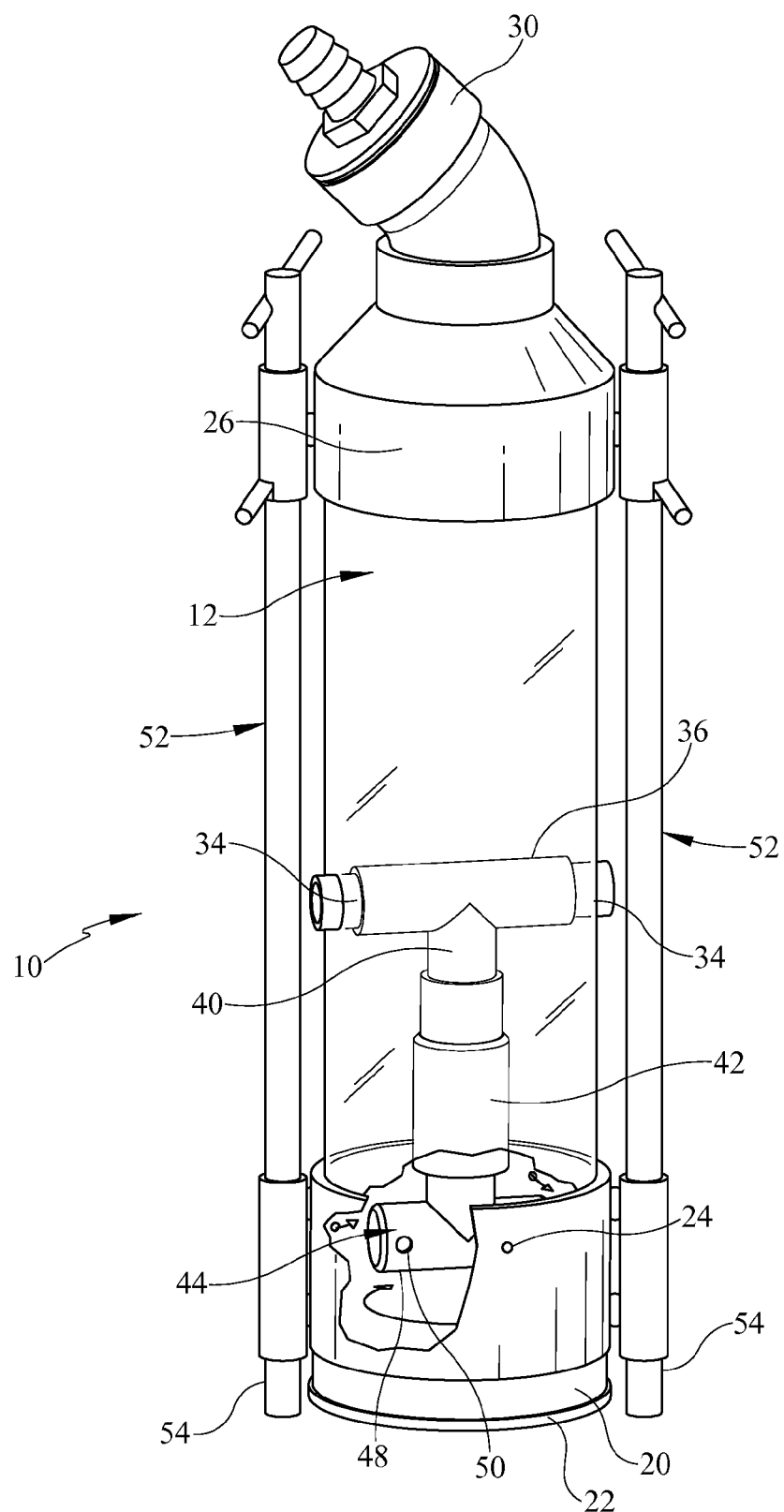
FIG. 1 is a perspective view of the aquarium cleaning system of the present invention.
Figure 2:
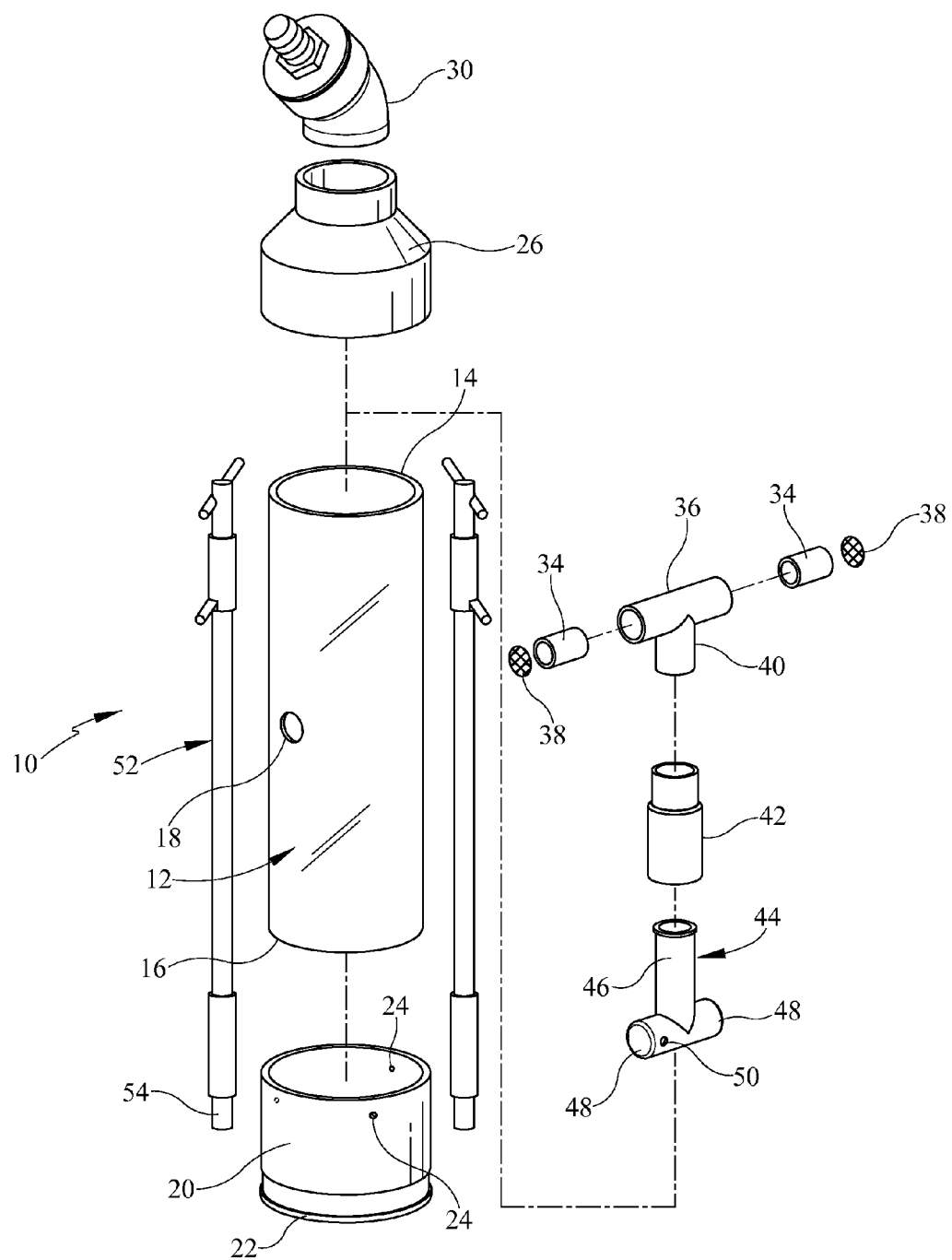
FIG. 2 is an exploded perspective view of the aquarium cleaning system.
Figure 3:
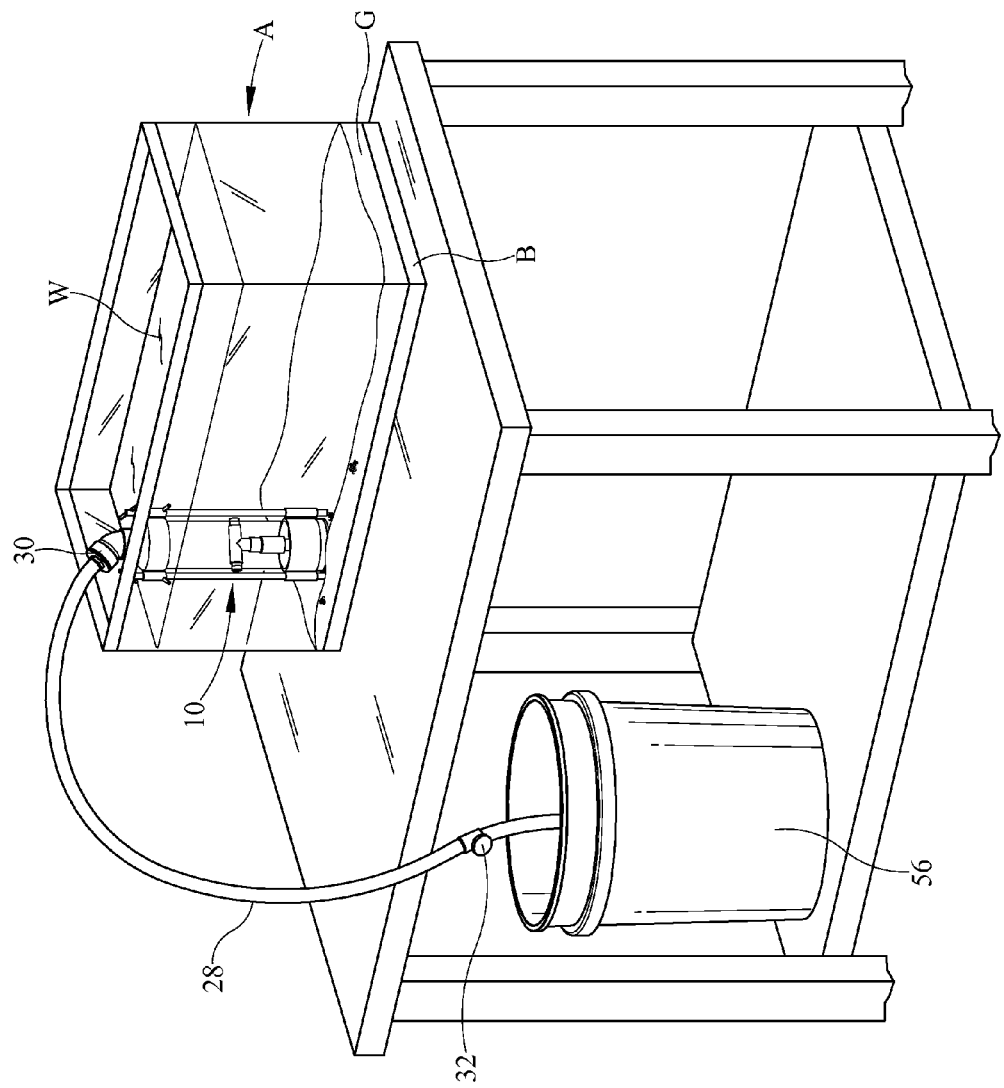
FIG. 3 is an environmental view of the aquarium cleaning system being used to clean an aquarium.

Referring now to the drawings, it is seen that the aquarium cleaning system of the present invention, generally denoted by reference numeral 10, is comprised of a housing 12 that is a hollow tubular member having an open top 14 and an open bottom 16. Advantageously, although not necessarily, the housing 12, which is made from appropriate material such as plastic, is clear so that a user can visually observe the actions within the housing 12 whenever the aquarium cleaning system 10 is operational. A pair of opposed openings 18 is located on the housing 12 approximately midway up the height of the housing 12. Attached to the bottom 16 of the housing 12 is a base 20 that has a rubber boot 22 encompassing the lower periphery of the base 20. A series of angled openings 24 are located on the base 20 such that whenever the housing 12 is attached to the base 20 (which may be simply by friction fitting the housing 12 into the top of the base 20, or the housing 12 may be adhered to the base 20), the housing 12 does not cover these openings 24. These openings 24 are substantially smaller relative to the openings 18 on the housing 12. It is understood that the housing 12 and the base 20 can be formed as an integral, even a monolithic unit, however, for ease of manufacture as well as to provide structural rigidity to the aquarium cleaning system 10, a two section housing 12 and base 20 combination is preferred.

A reducing coupling 26 is attached to the top 14 of the housing 12 either via friction fit or via adhesion, etc. A relatively small diameter siphon hose 28 is attached to the reduced distal end of the reducing coupling 26 via an appropriate hose fitting 30 of any appropriate design. One or more valves 32, either manual or electric (electric version not illustrated) with a control button is located proximate the housing 12. Again it is understood that the housing 12 and the reducing coupling 26 can be formed as an integral, even a monolithic unit, however, for ease of manufacture as well as to provide structural rigidity to the aquarium cleaning system 10, a two section housing 12 and reducing coupling 26 combination is preferred.

The base 20 and the reducing coupling 26 may be made from any appropriate material such as plastic, PVC, etc.

Protruding through each opening 18 on the housing 12 is an inlet tube 34, each connected to one end of a T-fitting 36. Located on the protruding end of each inlet tube 34 is a screen 38 to help prevent ingestion of large objects into the tubing system of the aquarium cleaning system 10. Attached to the downwardly facing base leg 40 of the T-fitting 36 is a rotator coupling 42. Rotatably attached to the opposing end of the rotator coupling 42 is a spray bar assembly 44 which is basically a T-fitting having a base leg 46 that is rotatably coupled to the rotator coupling 42 (appropriate seals are provided (not illustrated) to help prevent small sand and other particles from entering the connection area, which particles could interfere with proper rotation of the spray bar assembly) and a pair of extension arms 48 extending outwardly from the base leg 46. An opening 50 is located on each extension arm 48, each opening 50 facing in opposite direction relative to the other opening 50.

One or more riser arm assemblies 52, of any appropriate design, are attached to the aquarium cleaning system 10, advantageously to the base 20 and to the reducing coupling 26. The riser arm assemblies 52 provide a retractable riser arm 54 that helps hold the rubber boot 22 of the base 20 off of the bottom B of the aquarium A as more fully explained below.

In order to use the aquarium cleaning system 10 of the present invention, the sump of the aquarium A is turned off. The distal end of the siphon hose 28 is positioned into an appropriate fluid receiving vessel 56 located gravitationally below the aquarium A. The valve 32 on the siphon hose 28 is closed. The housing 12 is placed into the aquarium A and positioned over an area to be cleaned with the rubber boot 22 just above the bottom B of the aquarium A. If provided, the riser arms 54 of the riser arm assemblies 52 are extended to help hold the aquarium cleaning system 10 in this position above the bottom B. The valve 32 is opened and a siphon is established via the siphon hose 28 in any appropriate fashion (purely manually, mechanical assist, electric device assist, etc.,), so that water W flows through the housing 12, through the reducing coupling 26 and through the siphon hose 28 into the fluid vessel 56. This water W flow causes the substrate G to be ingested into the housing 12. Sufficient substrate G is so ingested until a bare spot at the bottom B of the aquarium A occurs, which bare spot is slightly larger than the outer diameter of the rubber boot 22. Thereafter, the housing 12 is lowered (riser arms 54 retracted, if used) until the rubber boot 22 is sitting on the bare bottom B of the aquarium A. Once the rubber boot 22 sits upon the bottom B of the aquarium A, the aquarium cleaning system 10 is sealed to the bottom B at the rubber boot 22 and a suction is formed thereat. As such, water W rushes into the housing 12 via its two openings 18, the water W flowing through the inlet tubes 34 and into the T-fitting 36, and down into the spray bar assembly 44. The water flows out of the two openings 50 on the extension arms 48 of the spray bar assembly 44 with sufficient force to cause the spray bar assembly 44 to rotate about the rotator coupling 42. The spinning spray bar assembly 44 causes the water exiting the openings 50 to form a vortex causing agitation of the substrate G which is suspended as a slurry, or fluidized bed within the upward flowing water W inside the housing 12 of the device. The interior cross section of the siphon hose 28 is on the order of about 4-5 times greater relative to the combined cross sections of the interior of the tubing system of the agitation subsystem (inlet tubes 34, T-fitting 36 and spray bar assembly 44) in order to achieve sufficient rotation of the spray bar assembly 44. Coincidentally, water W also rushes into the housing 12 via the small openings 24 on the base 20. These openings 24 are angled so that the incoming water W flow is in opposite direction relative to the vortex created by the water W flowing out of the openings 50 of the spray bar assembly 44, resulting in a counterflow vortex. These two colliding vortexes cause increased turbulence within the housing 12 and thus increased substrate G particle collisions. Such collisions increase the amount of the particulate organic carbon layer that is removed from the surface of the substrate G. After being bled off by collisions with other particles G, excess kinetic energy is then further depleted as the particle G rises inside the more gentle laminar flow in the upper portion of the housing 12. This slowing of the particle G allows gravity to carry it back toward the bottom of the housing 12 before it can be lost through the reducing coupling 26 at the top 14 of the housing 12. Particulate organic carbon material C, with its lesser specific gravity is then drawn out of the upper portion of housing 12 through the siphon tube 28 and is allowed to flow down to the vessel 56 below the aquarium A for either disposal (during water-change) or sedimentation-filtration and return to the aquarium system in a separate step of the substrate cleaning operation. Once the aquarium cleaning system 10 has been operational for a sufficient amount of time, say on the order of 30 to 60 seconds or so, the siphon hose control valve 32 is closed, thereby breaking the seal of the base 20 to the bottom B of the aquarium A returning the newly cleaned substrate material G to the bottom of the aquarium A. The aquarium cleaning system 10 is lifted up and moved to a different location within the aquarium A wherein the process is repeated. The user performs several such cleaning iterations until the aquarium A is sufficiently cleaned. If the volume of water W lost in this cleaning process exceeds the amount of water W to be changed then the contents of the vessel 56 in which most of the particulate matter C has settled is siphoned back into the sump of the aquarium A through a fine-mesh filter-bag. New water may be siphoned or pumped into the sump of the aquarium A and the circulation pump is started to refill the aquarium A itself.

Figure 4:
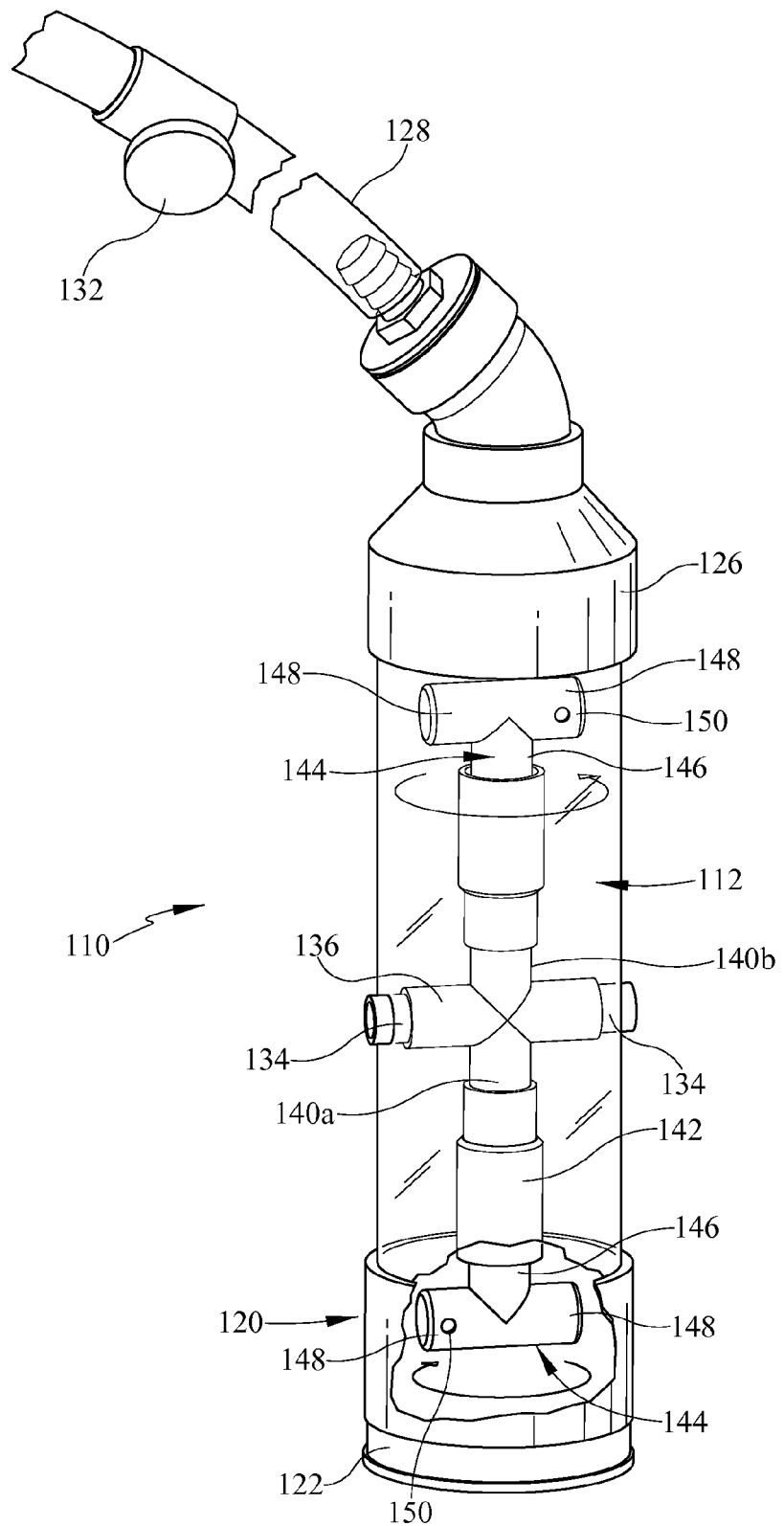
FIG. 4 is a perspective view of an alternate embodiment of the aquarium cleaning system of the present invention.
Figure 5:
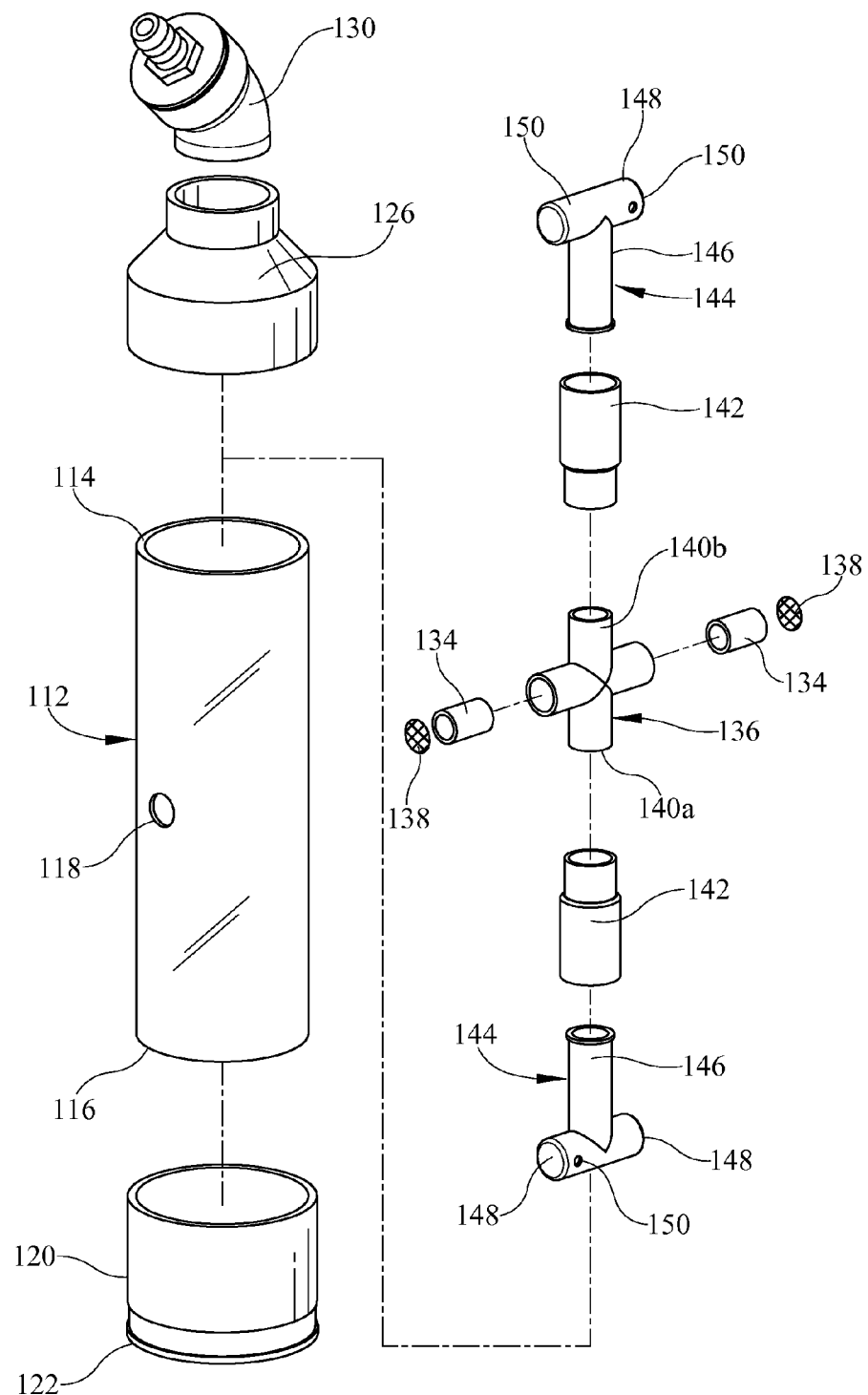
FIG. 5 is an exploded perspective view of the aquarium cleaning system of FIG. 4.
Figure 6:
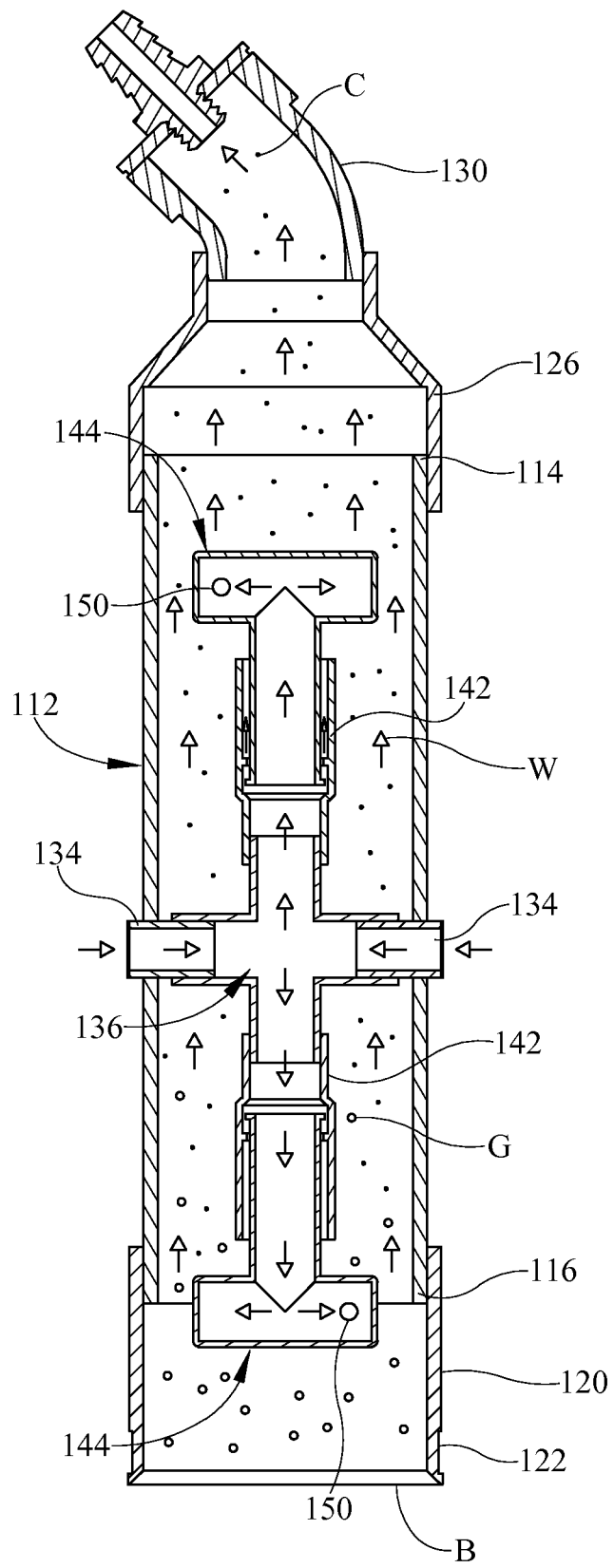
FIG. 6 is a cutaway view of the aquarium cleaning system of FIG. 4, illustrating the flow paths of the various elements within the system Similar reference numerals refer to similar parts throughout the several views of the drawings.

As seen in FIGS. 4-6 an alternate embodiment of the aquarium cleaning system of the present invention, generally denoted by reference numeral 110, is comprised of a housing 112 that is a hollow tubular member having an open top 114 and an open bottom 116. Advantageously, although not necessarily, the housing 112, which is made from appropriate material such as plastic, is clear so that a user can visually observe the actions within the housing 112 whenever the aquarium cleaning system 110 is operational. A pair of opposing openings 118 is located on the housing 112 approximately midway up the height of the housing 112. Attached to the bottom 116 of the housing 112 is a base 120 that has a rubber boot 122 encompassing the lower periphery of the base 120. The housing 112 may be attached to the base 120 by simply friction fitting the housing 112 into the top of the base 120, or the housing 112 may be adhered to the base 120. It is understood that the housing 112 and the base 120 can be formed as an integral, even a monolithic unit, however, for ease of manufacture as well as to provide structural rigidity to the aquarium cleaning system 110, a two section housing 112 and base 120 combination is preferred.

A reducing coupling 126 is attached to the top 114 of the housing 112 either via friction fit or via adhesion, etc. A relatively small diameter siphon hose 128 is attached to the reduced distal end of the reducing coupling 126 via an appropriate hose fitting 130 of any appropriate design. Again it is understood that the housing 112 and the reducing coupling 126 can be formed as an integral, even a monolithic unit, however, for ease of manufacture as well as to provide structural rigidity to the aquarium cleaning system 110, a two section housing 112 and reducing coupling 126 combination is preferred. One or more valves (not illustrated for brevity and clarity), either manual or electric with a control button is located proximate the housing 112.

The base 120 and the reducing coupling 126 may be made from any appropriate material such as plastic, PVC, etc.

Protruding through each opening 118 on the housing 112 is an inlet tube 134, each connected to one end of a cross-fitting 136. Located on the protruding end of each inlet tube 134 is a screen 138 to help prevent ingestion of large objects into the tubing system of the aquarium cleaning system 110. Attached to the downwardly facing base leg 140a of the cross-fitting 136 is a rotator coupling 142 while a second rotator coupling 142 is attached to the upwardly facing base leg 140b. Rotatably attached to the opposing end of each rotator coupling 142 is a spray bar assembly 144 which is basically a T-fitting having a base leg 146 that is rotatably coupled to its respective rotator coupling 142 (appropriate seals are provided (not illustrated) to help prevent small sand and other particles from entering the connection area, which particles could interfere with proper rotation of the spray bar assembly) and a pair of extension arms 148 extending outwardly from the base leg 146. An opening 150 is located on each extension arm 148, each opening facing in opposite direction relative to the other opening 150 such that the openings 150 on the lower spray bar assembly are 180 degrees out of phase relative to the openings 150 of the upper spray bar assembly.

One or more riser arm assemblies (not illustrated for brevity and clarity), of any appropriate design are attached to the aquarium cleaning system 110, advantageously to the base 120 and to the reducing coupling 126. The riser arm assemblies provide a retractable riser arm that helps hold the rubber boot 122 of the base 120 off of the bottom B of the aquarium A as more fully explained below.

In order to use the aquarium cleaning system 110 of the present invention, the sump of the aquarium A is turned off. The distal end of the siphon hose 128 is positioned into an appropriate fluid receiving vessel (not illustrated) located below the aquarium A. The valve 132 on the siphon hose 128 is closed. The housing 112 is placed into the aquarium A and positioned over an area to be cleaned with the rubber boot 122 just above the substrate G located on the bottom B of the aquarium A. If provided, the riser arms of the riser arm assemblies are extended to help hold the aquarium cleaning system 110 in this position above the substrate G. The valve 132 is opened and a siphon is established via the siphon hose 128 in any appropriate fashion (purely manually, mechanical assist, electric device assist, etc.,), so that water W flows through the housing 112, through the reducing coupling 126 and through the siphon hose 128 into the fluid vessel. The housing 112 is then lowered (riser arms retracted, if used) until the rubber boot 122 is sitting on the bare bottom B of the aquarium A. During device penetration through the substrate G, the housing 112 can be tilted slightly to help move the substrate G in order to provide a "clean" bottom surface for the rubber boot 122 to sit upon. Once the rubber boot 122 sits upon the bottom B of the aquarium A, the aquarium cleaning system 110 is sealed to the bottom B at the rubber boot 122 and a suction is formed thereat. As such, water W rushes into the housing 112 via its two openings 118, the water W flowing through the inlet tubes 134 and into the cross-fitting 136, and into each of the spray bar assemblies 144. The water flows out of the two openings 150 on the extension arms 148 of each of the spray bar assemblies 144 with sufficient force to cause each spray bar assembly 144 to rotate about its rotator coupling 142. As the openings 150 of the lower spray bar assembly 144 are 180 degrees out of phase relative to the openings 150 of the upper spray bar assembly 144, the two spray bar assemblies 144 rotate in opposite directions relative to one another. Each spinning spray bar assembly 144 causes the water W exiting its openings 150 to form a vortex causing agitation of the substrate G. As the two spray bar assemblies 144 each rotate in opposing directions, each produces a vortex of opposite direction relative to the other vortex. These two colliding vortexes cause increased turbulence within the housing 112 and thus increased substrate G particle collisions. Such collisions increase the amount of the sediment layer that is removed from the surface of the substrate G. After being bled off by collisions with other particles G, excess kinetic energy is then further depleted as the particle G rises inside the more gentle laminar flow in the upper portion of the housing 112. This slowing of the particle G allows gravity to carry it back toward the bottom of the housing 112 before it can be lost through the reducing coupling 126 at the top 114 of the housing 112. Particulate organic carbon material C, with its lesser specific gravity is then drawn out of the upper portion of housing 112 through the siphon tube 128 and allowed to flow down to the vessel below the aquarium A for either disposal (during water-change) or sedimentation-filtration & return to the aquarium system in a separate step of the substrate cleaning operation. The interior cross section of the siphon hose 128 is on the order of about 4-5 times greater relative to the combined cross sections of the interior of the flow tubes of the agitation subsystem (inlet tubes 134, cross-fitting 136 and spray bar assemblies 144) in order to achieve sufficient rotation of the spray bar assembly 144. Once the aquarium cleaning system 110 has been operational for a sufficient amount of time, say on the order of 30 to 60 seconds or so, the siphon hose control valve 132 is closed, thereby breaking the seal of the base 120 to the bottom B of the aquarium A. The aquarium cleaning system 110 is lifted up and moved to a different location within the aquarium A wherein the process is repeated. The user performs several such cleaning iterations until the aquarium A is sufficiently cleaned. If the volume of water W lost in this cleaning process exceeds the amount of water W to be changed then the contents of a vessel in which most of the particulate matter C has settled is siphoned back into the sump of the aquarium A through a fine-mesh filter-bag. New water may be siphoned or pumped into the sump of the aquarium A and the circulation pump is started to refill the aquarium A itself.

While the invention has been particularly shown and described with reference to embodiments thereof, it will be appreciated by those skilled in the art that various changes in form and detail may be made without departing from the spirit and scope of the invention.

I claim:
1. An aquarium cleaning system, the aquarium having a body of water therein, the aquarium cleaning system comprising:
    a tubular housing member having an open top and an open bottom;
    a rubber boot encompassing the bottom of the housing;
    a reducing cap attached to the top of the housing;
    a siphon hose extending from the reducing cap;

a pair of first openings located on opposing sides of the housing medially between the top and the bottom, each of the openings fluid flow connected to a fitting;

a first spray bar assembly downwardly and rotatably connected to the fitting, the first spray bar assembly having a pair of outwardly extending first arms, each first arm having a second opening thereon, each second opening facing in opposing direction relative to the other second opening, such that when the housing is placed into the body of water so that the first openings are within the body of water, a water stream enters into the first openings, the water stream flows into the first spray arm assembly and out of each second opening causing the first arms to rotate such that the water stream exiting the second openings causes a first vortex to rotate within the housing; and means for allowing water to enter the housing and create a second vortex that counter-rotates within the housing.

2. The aquarium cleaning system as in claim 1 further comprising a pair of screens, each screen covering a respective one of the first openings.

3. The aquarium cleaning system as in claim 2 further comprising a valve located on the siphon hose.

4. The aquarium cleaning system as in claim 3 further comprising a riser arm attached to the housing, the riser arm retractably extends below the rubber boot.

5. The aquarium cleaning system as in claim 4 wherein the means for allowing water to enter the housing comprise an angled opening located in the housing proximate the bottom.

6. The aquarium cleaning system as in claim 4 wherein the means for allowing water to enter the housing comprise a second spray bar assembly upwardly and rotatably connected to the fitting, the second spray bar assembly having a pair of outwardly extending second arms, each second arm having a third opening thereon, each third opening facing in opposing direction relative to the other third opening, such that when the housing is placed into the body of water so that the first openings are within the body of water, a water stream enters into the first openings, the water stream flows into the second spray arm assembly and out of each third opening causing the second arms to rotate in a direction opposite to the direction of rotation of the first spray arm assembly.

7. The aquarium cleaning system as in claim 4 wherein the means for allowing water to enter the housing comprises either an angled opening located in the housing proximate the bottom or a second spray bar assembly upwardly and rotatably connected to the fitting, the second spray bar assembly having a pair of outwardly extending second arms, each second arm having a third opening thereon, each third opening facing in opposing direction relative to the other third opening, such that when the housing is placed into the body of water so that the first openings are within the body of water, a water stream enters into the first openings, the water stream flows into the second spray arm assembly and out of each third opening causing the second arms to rotate in a direction opposite to the direction of rotation of the first spray arm assembly.

8. The aquarium cleaning system as in claim 1 further comprising a valve located on the siphon hose.

9. The aquarium cleaning system as in claim 1 further comprising a riser arm attached to the housing, the riser arm retractably extends below the rubber boot.

10. The aquarium cleaning system as in claim 1 wherein the means for allowing water to enter the housing comprise an angled opening located in the housing proximate the bottom.

11. The aquarium cleaning system as in claim 1 wherein the means for allowing water to enter the housing comprise a second spray bar assembly upwardly and rotatably connected to the fitting, the second spray bar assembly having a pair of outwardly extending second arms, each second arm having a third opening thereon, each third opening facing in opposing direction relative to the other third opening, such that when the housing is placed into the body of water so that the first openings are within the body of water, a water stream enters into the first openings, the water stream flows into the second spray arm assembly and out of each third opening causing the second arms to rotate in a direction opposite to the direction of rotation of the first spray arm assembly.

12. The aquarium cleaning system as in claim 4 wherein the means for allowing water to enter the housing comprises either an angled opening located in the housing proximate the bottom or a second spray bar assembly upwardly and rotatably connected to the fitting, the second spray bar assembly having a pair of outwardly extending second arms, each second arm having a third opening thereon, each third opening facing in opposing direction relative to the other third opening, such that when the housing is placed into the body of water so that the first openings are within the body of water, a water stream enters into the first openings, the water stream flows into the second spray arm assembly and out of each third opening causing the second arms to rotate in a direction opposite to the direction of rotation of the first spray arm assembly.

* * * * *